United States Patent [19]

Yuzui

[11] Patent Number: 4,493,450
[45] Date of Patent: Jan. 15, 1985

[54] WELDING APPARATUS FOR VEHICLE BODY OF TWO-WHEELED VEHICLE

[75] Inventor: Katsutoshi Yuzui, Wako, Japan

[73] Assignee: Honda Giken Kogyo Kabushiki Kaisha, Tokyo, Japan

[21] Appl. No.: 461,924

[22] Filed: Jan. 28, 1983

[30] Foreign Application Priority Data

Jan. 29, 1982 [JP] Japan ................... 57-11803
Jan. 29, 1982 [JP] Japan ................... 57-11804
Mar. 30, 1982 [JP] Japan ................... 57-50058

[51] Int. Cl.³ .................................. B23K 31/02
[52] U.S. Cl. ...................... 228/49 R; 198/403; 228/47
[58] Field of Search ............. 228/4.1, 6 R, 47, 49 R, 228/49 A, 182; 29/430; 219/79, 80; 198/403, 404

[56] References Cited

U.S. PATENT DOCUMENTS

| | | | |
|---|---|---|---|
| 2,142,109 | 1/1939 | Burke | 228/182 X |
| 3,968,559 | 7/1976 | Karlsson | 29/430 |
| 4,162,387 | 7/1979 | De Candia | |
| 4,392,601 | 7/1983 | Fujikawa et al. | 228/4.1 |
| 4,404,451 | 9/1983 | Niikawa et al. | 228/47 |

FOREIGN PATENT DOCUMENTS

| | | | |
|---|---|---|---|
| 147366 | 12/1978 | Japan | 198/403 |
| 84275 | 5/1982 | Japan | 228/4.1 |
| 685467 | 9/1979 | U.S.S.R. | 228/49 R |

*Primary Examiner*—Kenneth J. Ramsey
*Attorney, Agent, or Firm*—Armstrong, Nikaido, Marmelstein & Kubovcik

[57] ABSTRACT

Welding apparatus for a vehicle body of a two-wheeled vehicle including a machine base, at least one lower jig carrier mounted on the base for reciprocation between the first position and the second position ahead of the first position, clamping devices for holding a workpiece on the lower jig carrier, a machine frame mounted over the machine base at the second position, an upper jig carrier mounted on the machine frame which is moveable upwardly and downwardly and is reciprocatable between the second position and a third position ahead of the second position, a second set of clamping devices for holding the workpiece on the upper jig carrier, welding devices at the second position for welding certain predetermined points on the workpiece, and structure designed for reversibly changing the orientation of the upper jig carrier while holding the workpiece by 180°. The apparatus further includes equipment at the third position for welding another set of certain predetermined points on the workpiece. Additionally, another lower jig carrier can be provided together with apparatus at the first position for alternating the two lower jig carriers to be alternately reciprocated between the first position and the second position.

3 Claims, 10 Drawing Figures

WELDING APPARATUS FOR VEHICLE BODY OF TWO-WHEELED VEHICLE

BACKGROUND OF THE INVENTION:

This invention relates to an apparatus for welding a vehicle body chiefly for a motorized two-wheeled vehicle.

In a previously known apparatus of this kind, a workpiece comprising plural members for constituting a vehicle body or frame of the two-wheeled vehicle is set on a jig carrier, the jig carrier is advanced to a particular position for certain points on the frame to be welded by welding robots or the like. In this case, it has been usual with this type of apparatus that the workpiece moves through multiple stages and has different points welded at each advanced position thereof. Accordingly, certain inconveniences result in that the apparatus necessarily is long in length as a whole and is liable to occupy a large installation floor space. Further, it requires a large number of welding robots at each step and is liable to be complicated in construction and high in price.

OBJECTS AND SUMMARY OF THE INVENTION

An object of the present invention is to provide an apparatus for welding a vehicle body for frame of a motorized two-wheeled vehicle which is compact.

Another object of the present invention is to provide an apparatus wherein the workpiece which constitutes the vehicle body can be simply and easily turned over in orientation so that different points can be welded at the same position in the apparatus.

It is still a further object of the present invention to provide an apparatus which makes the welding operation on a vehicle body for a motorized two-wheeled vehicle more efficient.

It is yet another object of the present invention to provide an apparatus which does not require a large number of welding robots at each stage.

It is still yet another object of the present invention to provide an apparatus which is simple in construction and lower in price than those of the prior art.

These and other objects are obtained in a welding apparatus for a vehicle body of a two-wheeled vehicle comprising a machine base, at least one lower jig carrier mounted on the machine base for reciprocation between a first position and a second position ahead of the first position, means on the machine base for reciprocating the lower jig carrier, a machine frame mounted over the machine base at the second position, an upper jig carrier mounted on the machine frame for both movement upwardly and downwardly and for reciprocation between the second position and a third position ahead of the second position, means for reversibly changing the orientation of the upper jig means holding the workpiece by 180°, and means for welding certain predetermined points on the workpiece based at the second position. The lower jig carrier has the first clamping means thereon for holding the workpiece on the lower jig carrier. The workpiece consists of plural members which when welded at a first set and at a second set of certain predetermined points constitutes the vehicle body. A means for reciprocating the lower jig carrier is provided on the machine base. A means for reciprocating the upper jig carrier is provided on the machine frame. A means for moving the upper jig carrier upwardly and downwardly is provided on the means for reciprocating. A second clamping means for holding the workpiece is provided on the upper jig carrier. The means for reversibly changing the orientation of the upper jig carrier holding the workpiece by 180° is provided on the means for moving the upper jig carrier upwardly and downwardly. That is, the upper jig means can hold the workpiece, move upwardly, turn over by 180°, and then move back downwardly. This enables two different sets of points on the workpiece to be welded at the same work station, namely, the second position.

The apparatus can additionally comprise means at the third position for welding the second set of certain predetermined points. Such a modification is desirable if a faster through-put of workpieces is needed.

The apparatus can still further comprise another lower jig carrier in addition to the first one together with means at the first position for alternating the two lower jig carriers to be alternately reciprocated between the first position and the second position. Such a means can comprise a turntable so that while a lower jig carrier is at the second position holding the workpiece being welded, an additional workpiece can be set on the other lower jig means so that it is ready to be advanced to the second position.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Embodying examples of this invention will now be explained with reference to the accompanying drawings:

Referring to the drawings, a machine base 1 has a pair 1a of guide rails provided thereon so as to extend in the longitudinal direction thereof. At least one lower jig carrier 2, that is, one carrier 2, for instance, is provided on the guide rails 1a. The carrier 2 is connected to a prime mover 5, such as an electric motor or the like, through a rack bar 3 and a pinion 4 engaged therewith so as to be reciprocated between a first position A and a second position B in front thereof. The jig carrier 2 is detachably connected to the rack bar 3 by engaging and disengaging of the pin 31 of a cylinder 30. The carrier 2 is provided thereon with a jig table 6 so that a workpiece a comprising plural members a1, a2, a3 ..... for constituting a vehicle body or frame of a two-wheeled vehicle may be set and held thereon by means of plural first clamp means 7. A machine frame 8 is built on the machine base 1 and surrounds the carrier 2 at the second position B and has a forwardly extended frame portion. An upper jig carrier 9 is provided on the machine frame 8 connected to a prime move 12, such as an electric motor or the like, through a rack bar 10 and a pinion 11 engaged therewith so as to be reciprocated between the second position B and a third position C in front thereof. The upper jig carrier 9 is also provided, through an elevating frame 13 extending downwards therefrom, with a jig 14 arranged to detachably hold the workpiece a and be turned reversibly upwardly and downwardly. More in detail, the elevating frame 13 is supported at its front and rear portions by each pair of right and left guide bars 15, 15 and is connected at its middle portion to a cylinder 16 so that it may be moved upwardly and downwardly by operation of the cylinder 16. Additionally, the jig 14 is turnably supported through its front and rear shafts 17, 17 on a lower end portion of the elevating frame 13 so as to be turnable reversibly upwardly and downwardly. The jig 14 is also in engagement at respective pinions 18, 18 on the respective shafts 17, 17 with respective rack bars 19, 19 extending vertically. The two rack bars 19, 19 are interconnected through an intermediate synchronized shaft 20. One of the rack bars is connected to a cylinder 21 provided on the top portion of the rack bar, and thus the jig 14 may be given a turning movement by operation of the cylinder 21. Additionally, the jig 14 is in the form of a frame surrounding the workpiece a and has plural clamp means 22 so that the workpiece a may be detachably held thereby. Further, the jig 14 has at each of front and rear end pinions thereof a pair of stopper arms 14a, 14a so that, by cooperation thereof with both end surfaces of a stopper plate 14b provided above the stopper arms, the same may be stopped at its upper and lower turned positions.

In the illustrated example of FIGS. 1 to 6, a delivery carrier 24 for delivering the workpiece a to be welded is provided at the third position C. Additionally, there is provided a turn table 25 at the first position A so that the lower jig carrier 2 positioned at the first position A may be changed over, by turning of the table 25, between a setting position $A_2$ on one side thereof and a waiting position $A_1$ on the other side thereof. Additionally, the second position B is provided on each side thereof with plural welding robots 26 so that the workpiece a may be welded at certain predetermined points thereof at the second position B.

Figure 1:
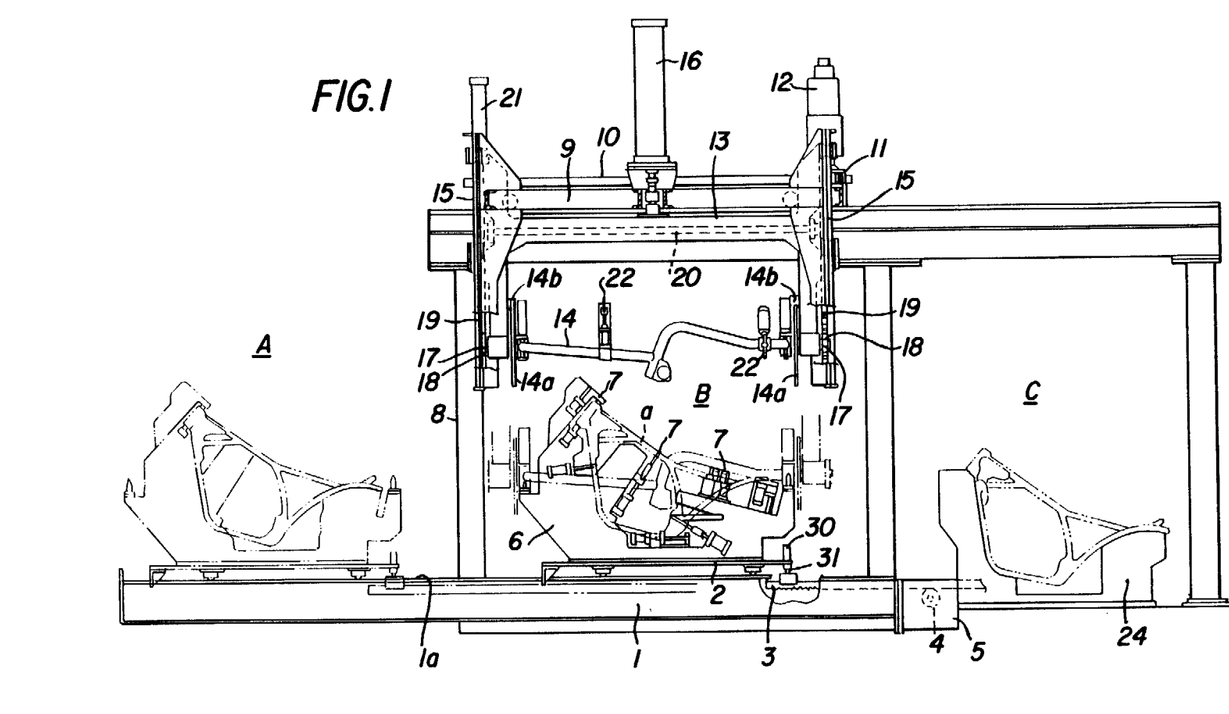
FIG. 1 is a side view of one example of this invention with its welding gun portion being omitted.
Figure 2:
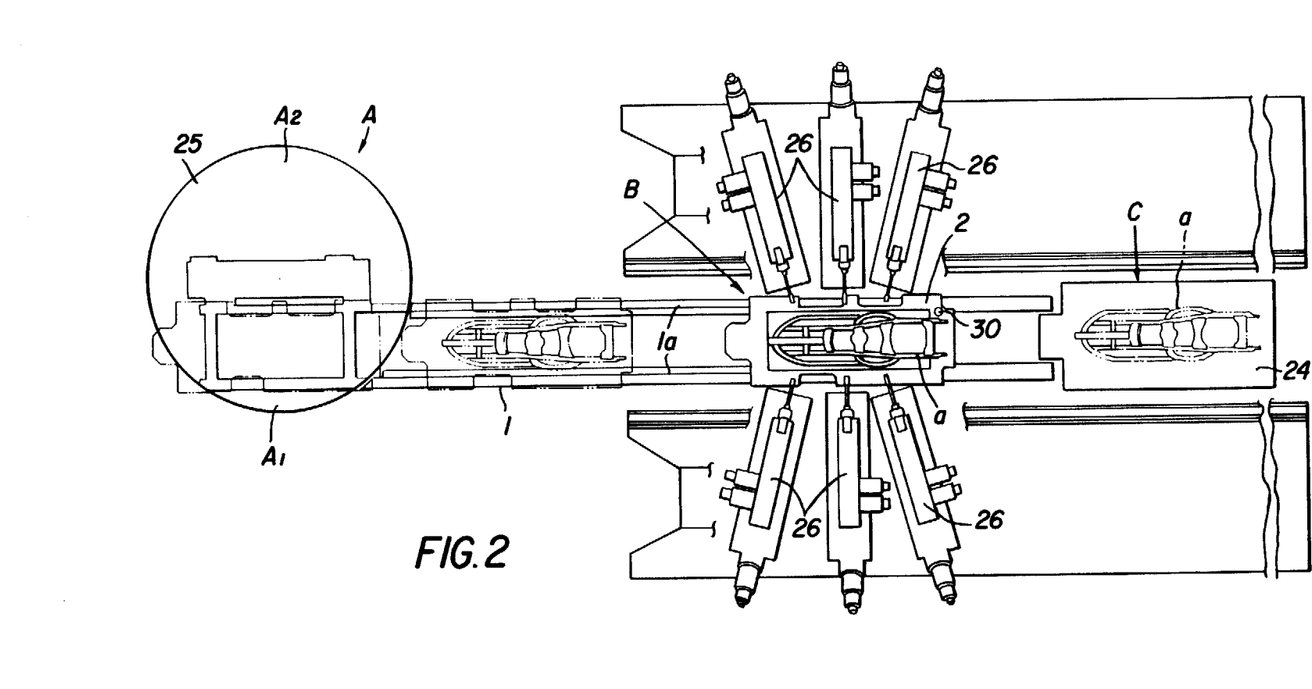
FIG. 2 is a diagrammatical top plan view thereof.
Figure 3:
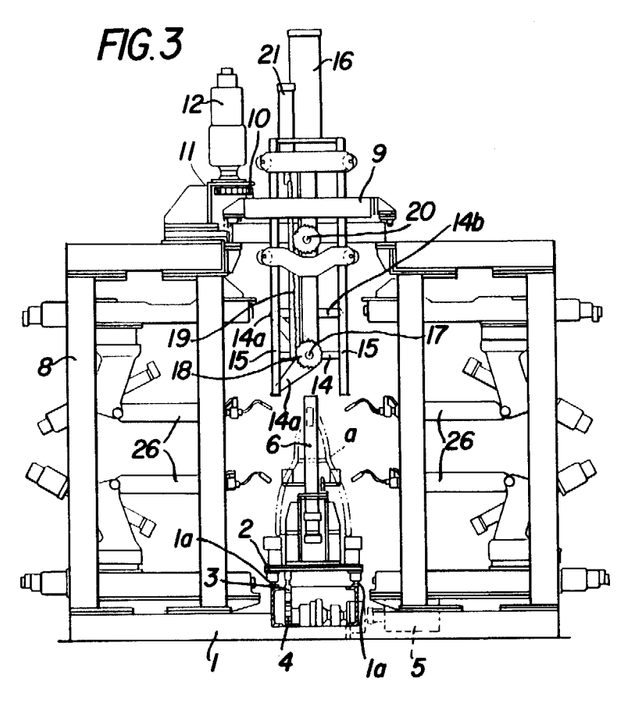
FIG. 3 is a front view of the same.
Figure 4:
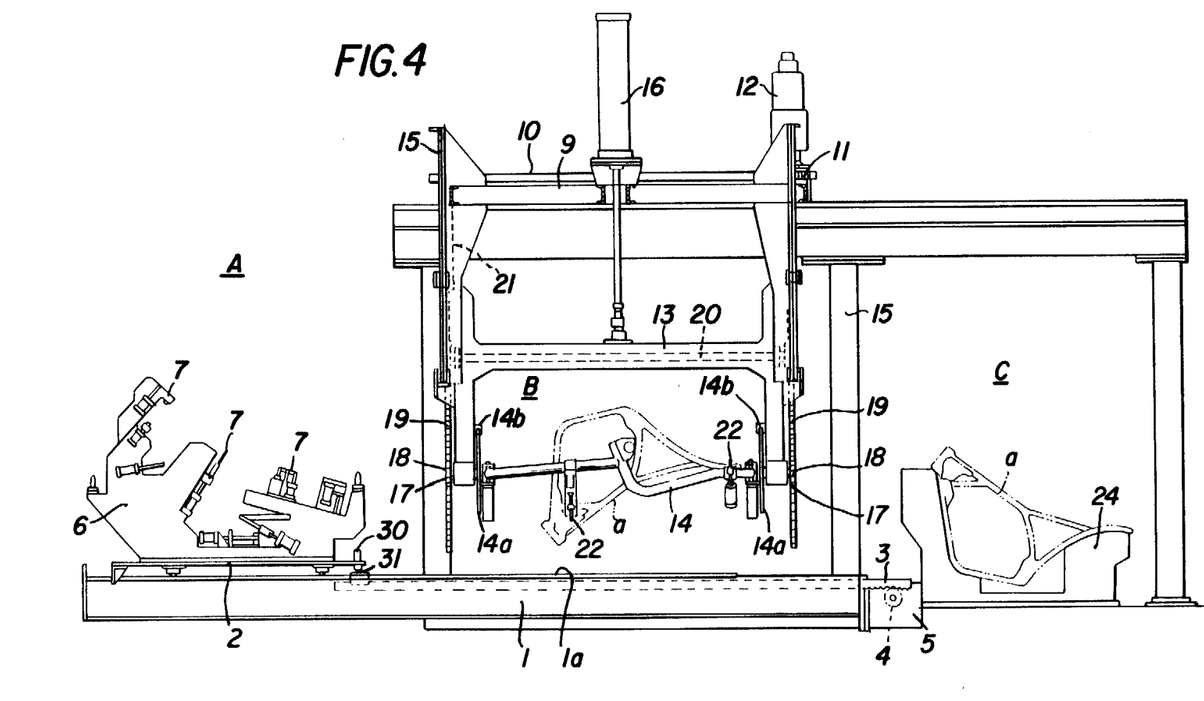
FIG. 4 is a side view of the same for explaining the operation thereof.
Figure 5:
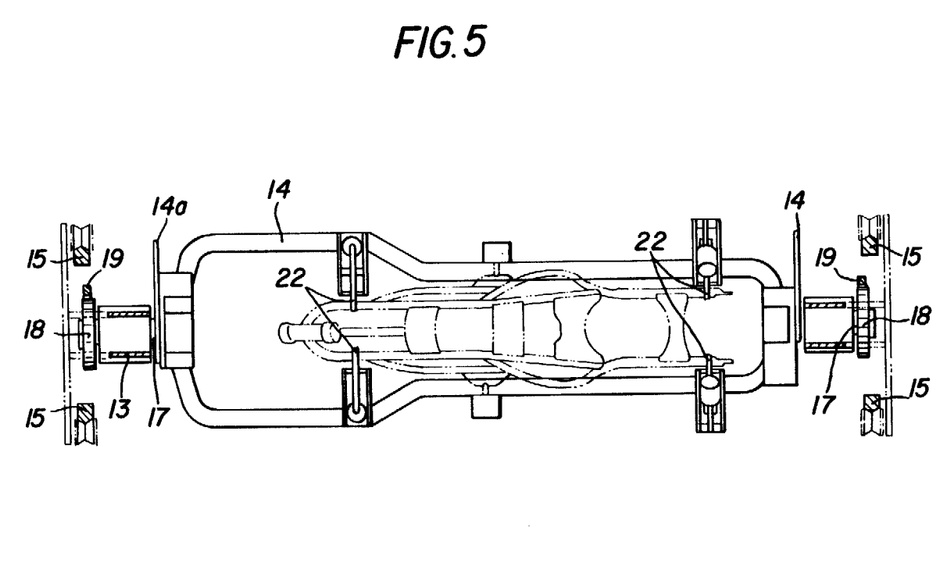
FIG. 5 is a top plan view, partly omitted, of a jig portion thereof.
Figure 6:
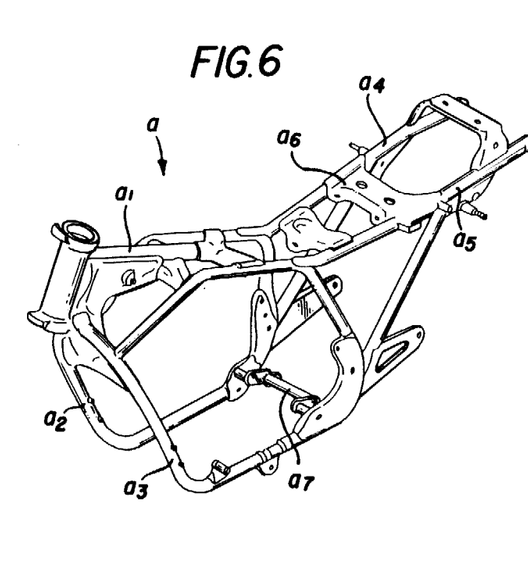
FIG. 6 is a perspective view of a welded workpiece.

Next, the operation of the apparatus will be explained as follows:

After the lower jig carrier 2 is positioned at the first position A, a workpiece a to be welded is set thereon at that position. After the workpiece a is advanced to the second position B, the same is welded at a first set of the certain predetermined points by the robots 26. Thereafter, the workpiece a is released from the first clamping means 7, and the jig 14 on the upper jig carrier 9 is lowered and the workpiece a is held by second clamping means 22. The workpiece a is then moved upwardly and is turned upside down. Thereafter, it is lowered and is welded at a second set of the certain predetermined points by the robots 26. During this operation, the lower jig carrier 2 is returned to the first position A so as to be ready for setting a next workpiece a thereon.

After the second welding, the resultant welded workpiece a is moved upwardly by the jig 14 and is moved to the third position C by an advance movement of the upper jig carrier 9. It is then lowered and is released from second clamping means 22 and is transferred to the carrier 24 in order to be ready to be delivered outwards thereby.

Figure 7:
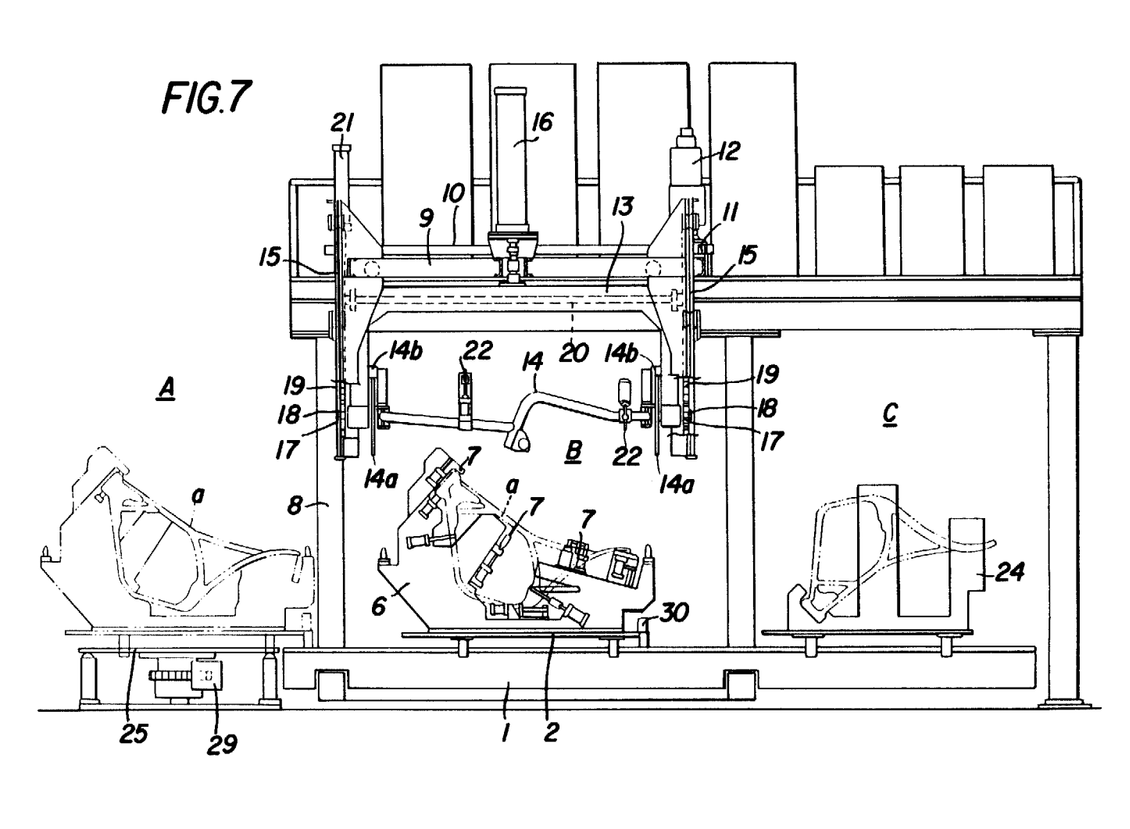
FIG. 7 is a side view of a modified example of this invention with its welding gun portion being omitted.
Figure 8:
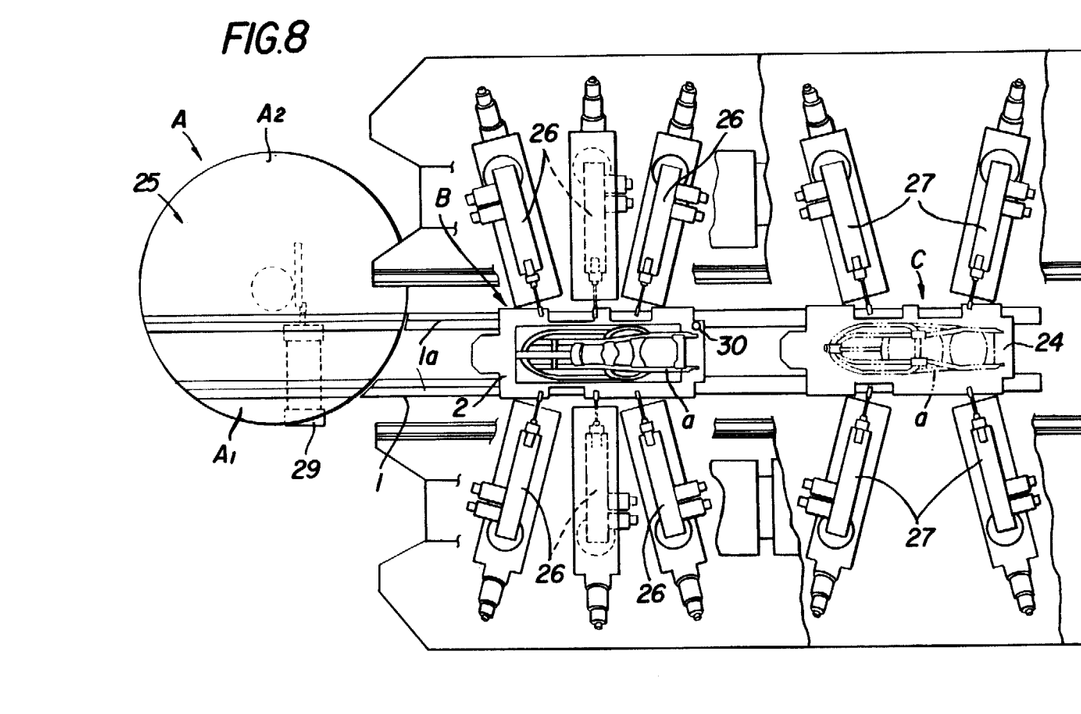
FIG. 8 is a diagrammatical top plan view thereof.

FIGS. 7 and 8 show a modified example of the present invention. In this example, plural welding robots 27 are provided at the third position C so that the foregoing second welding may be carried out by these robots 27. Namely, the workpiece a welded at the first set of certain predetermined points at the second position B is transferred to the upper jig carrier 9 and is then turned upside down. Thereafter, the same is advanced to the third position C and is given the second welding at the second set of certain predetermined points by the robots 27 at that position C under the condition that the same is lowered or that the same is lowered and is transferred to the carrier located below.

Figure 9:
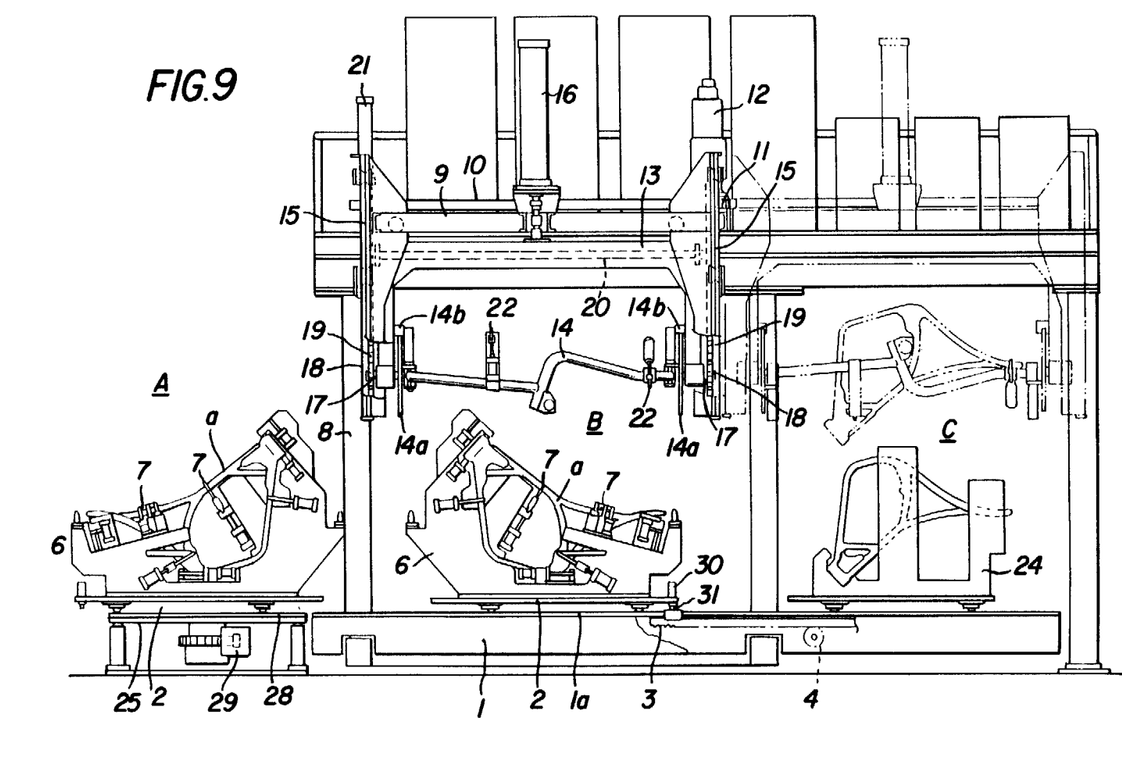
FIG. 9 is a side view of another modified example of this invention with its welding gun portion being omitted.
Figure 10:
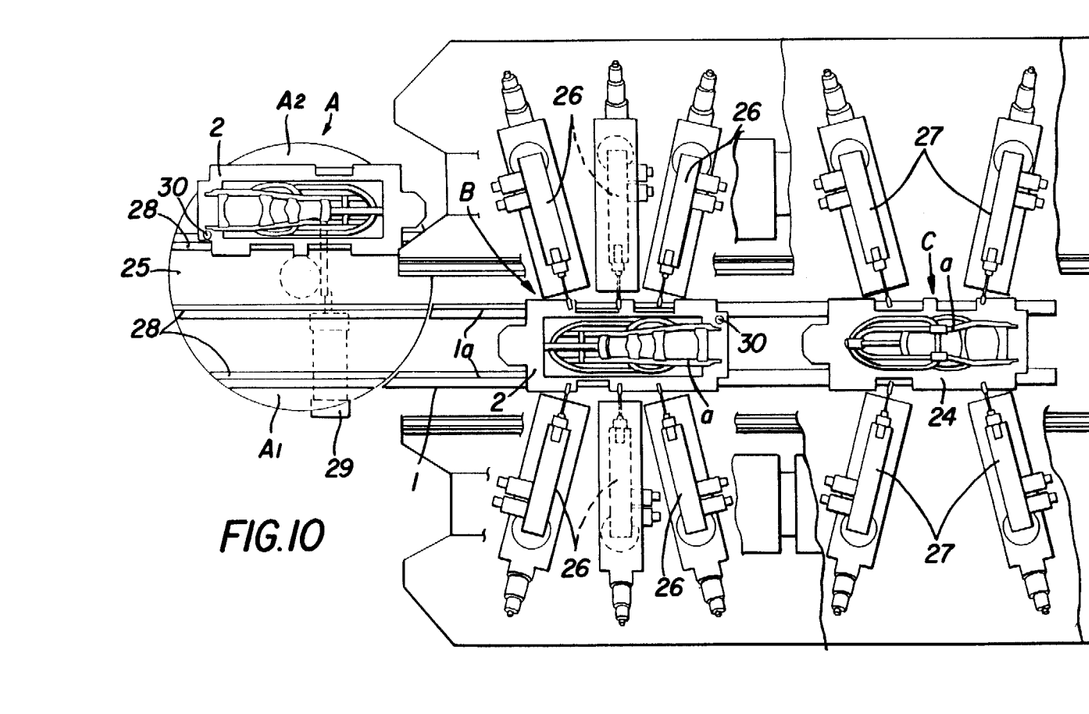
FIG. 10 is a diagrammatical top plan view thereof.

In such a case that the second welding is carried out at the third position C, the apparatus can be modified as shown in FIGS. 9 and 10. In this example, the number of the abovementioned at least one lower jig carrier 2 comprises two, for instance. The two carriers 2, 2 are so arranged that one and the other thereof may be alternately, that is, by turns, reciprocated between the first position A and the second position B.

More in detail, the turn table 25 is provided at the first position A as described before, and two pairs of rails 28, 28 for the two carriers 2, 2 are attached to the turn table 25 in such a manner that when one pair of the rails 28 are positioned at a waiting position $A_1$ on one side which is in alignment with the foregoing guide rails 1a, the other pair thereof are positioned at a setting position $A_2$ which is on the other side. Thus, these pairs of rails 28, 28 may be alternately changed over between the waiting position $A_1$ and the setting position $A_2$ by turning of the table 25. In this manner, the two jig carriers 2, 2 may be alternately, that is, by turns, reciprocated between the waiting position $A_1$ and the second position B. A cylinder 29 is provided for reversibly turning the turntable 25.

Next, the operation of this modified apparatus will be explained as follows:

As shown clearly in FIG. 10, during the time when one of the two lower jig carriers 2, 2, is advanced to the second position B and the workpiece a set thereon is welded with the first welding, the other thereof is positioned at the setting position $A_2$ of the table 25 at the first position A and a next workpiece a is set thereon. In other words, during the time when the first welding is carried out at one carrier 2 positioned in front, the next workpiece a is prepared on the other carrier 2 positioned in rear.

After the workpiece a thereon is removed upwardly from the carrier 2 at the second position, the carrier 2 is retreated and returned to the waiting position $A_1$ on one side of the table 25 at the first position A, and if the turn table 25 is, then, operated to turn, that carrier 2 is moved to the setting position $A_2$ and is ready for being set with the next workpiece a, and at the same time the other carrier 2 positioned at the setting position $A_2$ is moved to the waiting position $A_1$. Accordingly, the other carrier 2 is then advanced to the second position B so that the new workpiece a set thereon may be welded with the first welding. Thus, in the meanwhile, a new workpiece a is always prepared on the carrier in rear, so that supplying of the new workpiece a to the second position B can be always carried out soon. The remainder of the structure is not especially different from the foregoing first example.

Thus, according to this invention, the apparatus is so arranged that the workpiece comprising plural numbers for constituting a vehicle body or frame of a two-wheeled vehicle is first set on the lower jig carrier and is welded with the first welding, and then the same is transferred to the upper jig carrier and is turned upside down and is applied with the second welding. In this manner, the workpiece can be welded at the respective first and second set of points in its upward posture and in its downward posture. Thereby, the same can be given good weldings on the respective portions thereof. Also, the welding operation can be carried out at a higher efficiency than that in the conventional apparatus wherein the corresponding weldings are carried out at multiple progressive steps under the condition that the workpiece is left as it is in its regular or upward posture. Additionally, the apparatus can be smaller in size and lower in price.

It is readily apparent that the above-described welding apparatus for a vehicle body of a two-wheeled vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A welding apparatus for a vehicle body of a two-wheeled vehicle comprising:
   a machine base,
   at least one lower jig carrier mounted on said machine for reciprocation between a first position and a second position ahead of said first position,
   means on said machine base for reciprocating said lower jig carrier,
   first clamping means for holding a workpiece on said lower jig carrier, said workpiece consisting of plural members which when welded at a first set and a second set of certain predetermined points constitutes said vehicle body,
   a machine frame mounted over said machine base at said second position,
   an upper jig carrier mounted on said machine frame for movement upwardly and downwardly relative to said machine base and for reciprocation between said second position and a third position ahead of said second position,
   means on said machine frame for reciprocating said upper jig carrier,
   means on said means for reciprocating for moving said upper jig carrier upwardly and downwardly,
   second clamping means for holding said workpiece on said upper jig carrier,
   means on said means for moving for reversibly changing the orientation of said upper jig carrier holding said workpiece by 180°, and
   means at said second position for welding at least said first set of said certain predetermined points on said workpiece.

2. The apparatus of claim 1, further comprising means at said third position for welding said second set of said certain predetermined points.

3. The apparatus of claim 1, further comprising another lower jig carrier, and means at said first position for alternating the two lower jig carriers to be alternately reciprocated between said first position and said second position.

* * * * *

UNITED STATES PATENT AND TRADEMARK OFFICE
CERTIFICATE OF CORRECTION

PATENT NO.    :  4,493,450
DATED         :  January 15, 1985
INVENTOR(S)   :  KATSUTOSHI YUZUI It is certified that error appears in the above-identified patent and that said Letters Patent is hereby corrected as shown below:

Substitute the following formal drawings of Figures 4, 7, and 9 for the drawings of said figures.

Signed and Sealed this

Twenty-sixth Day of January, 1988

*Attest:*

DONALD J. QUIGG

*Attesting Officer*    *Commissioner of Patents and Trademarks*